(12) United States Patent
Harada (10) Patent No.: US 8,429,561 B2
(45) Date of Patent: Apr. 23, 2013

(54) INFORMATION SEARCH METHOD AND APPARATUS

(75) Inventor: Keiichi Harada, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 705 days.

(21) Appl. No.: 12/357,101

(22) Filed: Jan. 21, 2009

(65) Prior Publication Data

US 2009/0204584 A1     Aug. 13, 2009

(30) Foreign Application Priority Data

Feb. 8, 2008   (JP) .................................. 2008-028245

(51) Int. Cl.
*G06F 3/048* (2006.01)

(52) U.S. Cl.
USPC .......................................................... 715/816

(58) Field of Classification Search .................. 715/816
See application file for complete search history.

(56) References Cited

U.S. PATENT DOCUMENTS

| | | | |
|---|---|---|---|
| 5,600,825 A * | 2/1997 | Atkins et al. ........................ 1/1 |
| 6,088,649 A | 7/2000 | Kadaba et al. |
| 6,846,979 B2 * | 1/2005 | Kondo ............................ 84/609 |
| 7,366,994 B2 * | 4/2008 | Loui .............................. 715/764 |
| 2002/0046209 A1 * | 4/2002 | De Bellis ........................ 707/10 |
| 2002/0113824 A1 * | 8/2002 | Myers, Jr. ...................... 345/810 |
| 2002/0133488 A1 * | 9/2002 | Bellis et al. ..................... 707/6 |
| 2004/0085364 A1 * | 5/2004 | Keely et al. .................... 345/804 |
| 2004/0143598 A1 * | 7/2004 | Drucker et al. ............ 707/104.1 |
| 2005/0091604 A1 * | 4/2005 | Davis ............................. 715/772 |
| 2005/0195173 A1 * | 9/2005 | McKay ......................... 345/173 |
| 2005/0246352 A1 * | 11/2005 | Moore et al. ................. 707/100 |
| 2006/0036942 A1 * | 2/2006 | Carter .......................... 715/526 |
| 2006/0101490 A1 * | 5/2006 | Leurs .............................. 725/45 |
| 2006/0184901 A1 * | 8/2006 | Dietz ............................ 715/855 |
| 2006/0242599 A1 * | 10/2006 | Choo et al. ................... 715/821 |
| 2007/0055654 A1 * | 3/2007 | Robbin et al. .................... 707/3 |

(Continued)

FOREIGN PATENT DOCUMENTS

| | | |
|---|---|---|
| JP | 5-96869 | 12/1993 |
| JP | 2000-67059 | 3/2000 |

(Continued)

OTHER PUBLICATIONS

Alpine IVA-W205-manual (p. 56).

(Continued)

*Primary Examiner* — Tuyetlien Tran
(74) *Attorney, Agent, or Firm* — Brinks Hofer Gilson & Lione (57) ABSTRACT

Names of pieces of information to be searched are arranged in a predetermined order, and a range display bar that is divided into sections is formed on a screen. A detailed-name-of-information display section is formed adjacent to the range display bar to display detailed information associated with the names in a scrollable manner. An arbitrary range on the range display bar may be designated as a range of the names to be searched. Preferably, the names corresponding to the divided sections are searched with respect to the designated range for the names. Predetermined portions of the names obtained through the search are displayed on the divided sections. Preferably, the portions of the names include at least the initial letter of the names. The detailed information associated with the names in the designated range is displayed on the detailed-name-of-information display section in the arrangement order.

16 Claims, 6 Drawing Sheets

U.S. PATENT DOCUMENTS

| | | | |
|---|---|---|---|
| 2007/0086280 A1* | 4/2007 | Cappello et al. | 369/30.06 |
| 2007/0136286 A1* | 6/2007 | Webster et al. | 707/7 |
| 2007/0247436 A1* | 10/2007 | Jacobsen | 345/173 |
| 2008/0042984 A1* | 2/2008 | Lim et al. | 345/173 |
| 2008/0100585 A1* | 5/2008 | Pohjola | 345/173 |
| 2008/0126996 A1* | 5/2008 | Morris et al. | 715/854 |
| 2008/0174570 A1* | 7/2008 | Jobs et al. | 345/173 |
| 2008/0177468 A1 | 7/2008 | Halters et al. | |
| 2008/0270347 A1* | 10/2008 | Zhou et al. | 707/2 |
| 2008/0309614 A1* | 12/2008 | Dunton et al. | 345/156 |
| 2008/0318197 A1* | 12/2008 | Dion | 434/322 |
| 2009/0019475 A1* | 1/2009 | Lee et al. | 725/37 |
| 2009/0207139 A1* | 8/2009 | Kraft | 345/173 |
| 2010/0156815 A1* | 6/2010 | Silberman et al. | 345/173 |
| 2010/0174993 A1* | 7/2010 | Pennington et al. | 715/738 |

FOREIGN PATENT DOCUMENTS

| | | |
|---|---|---|
| JP | 2001-184153 | 7/2001 |
| JP | 2004-139321 | 5/2004 |
| JP | 2006-018965 | 1/2006 |
| JP | 2006-331598 | 12/2006 |
| JP | 2002-230951 | 8/2007 |

OTHER PUBLICATIONS

Office Action from Japanese Patent Office dated Jul. 9, 2012 with English translation.

* cited by examiner

INFORMATION SEARCH METHOD AND APPARATUS

RELATED APPLICATION

The present application claims priority to Japanese Patent Application Number 2008-028245, filed on Feb. 8, 2008, the entirety of which is hereby incorporated by reference.

BACKGROUND OF THE INVENTION

1. Field of the Invention

The present invention relates to an information search method and apparatus for easily searching and selecting a desired piece of information from a large number of pieces of information.

2. Description of the Related Art

Some audio apparatuses employ a compact, large-capacity data storage medium, such as a memory chip or a hard disk, to record a large number of pieces of audio data (e.g. tracks of music) that are compressed using the MP3 standard or the like. In the case of portable audio apparatuses, the compact size allows users to carry them around and enjoy the recorded audio data anytime and anywhere. On-vehicle audio apparatuses also often have a large-capacity data storage medium, such as a hard disk, to allow users to listen to a desired music track by selecting it from a large number of music tracks stored therein. On-vehicle audio apparatuses and household audio apparatuses may also be configured to allow portable audio players or the like to connect thereto in a wired or wireless manner so as to allow the user(s) to listen to desired music by selecting it from a large number of music tracks stored on a data storage medium of the portable audio player(s).

During selection of a desired piece of music from a large number of pieces of music, information associated with the music tracks, such as artist names, genre names, song/track titles (names), and album titles (names), may be used. With such an arrangement, the user can select a desired music track by, for example, directly entering its music title into a search field to search a list of music titles. This scheme, however, involves significant time and effort. Thus, a list of track titles for all recorded music tracks may be created, and a portion of a list of all the recorded music tracks may be displayed on a screen in a scrollable manner. In this way, the user may select a desired piece of music by scrolling through the list by, for example, giving an instruction/input using a remote controller or touching a touch panel or button on the screen.

Such a scheme for sequentially displaying information through scrolling makes it much easier to select a desired piece of information than a scheme that involves manual input of the desired music track. Further, it is more convenient since the user can find the desired piece of information without having to accurately remember the title or the like of the desired music track. In many cases, however, audio apparatuses as described above may hold as many as 10,000 pieces of music, and the number of artists and/or groups may also exceed several hundreds. Thus, when information, for example, a large number of pieces of music and/or a large number of artists, is displayed on a small screen and is scrolled to search for a desired music track as described above, if the desired music track exists near the bottom of the list it may take a long time to locate it. Also, when the displayed information is scrolled through at high speed, the user is likely to miss the desired music track during the scrolling operation. Thus, it is difficult to use such a searching scheme.

In an effort to resolve such deficiencies, Japanese Unexamined Utility Model Registration Application Publication No. 5-96869 discloses a technology in which, when a user specifies, for example, the letter "M" in a large number of pieces of information arranged in a predetermined order, such as an alphabetical order, pieces of information having the initial letter "M" can be selected and displayed. With this search scheme, however, it is necessary to ensure that at least the initial letters of the pieces of information are stored and associated therewith. In addition, the search method still requires having to select desired information through a scrolling operation or the like after selecting the initial letter of a specific word for the desired piece of information. Thus, as described above, when a significantly large number of pieces of information exist, a problem exists in that it takes a significant amount of time to locate the desired piece of information.

As a scheme for overcoming the above-described problem, Japanese Unexamined Patent Application Publication No. 2002-230951, which is assigned to the Alpine Electronics, Inc., the assignee of the present application, discloses an information selecting technology. In this technology, a display bar indicating 0 to 100% is provided on a screen, and when a user touches an arbitrary percentage portion thereon, a predetermined number of pieces of information centered about the touched percentage portion are extracted and displayed in numerical order. At this point, the initial letters of the pieces of information are then displayed in alphabetical order so that the user may select a desired piece of information therefrom.

As disclosed in Japanese Unexamined Patent Application Publication No. 2002-230951, even when a significantly large number of pieces of information exist, a user can give an instruction based on an assumption about an approximate location of the desired information, and can select the desired information from pieces of information in the vicinity of the assumed location. Such technology allows the user to more quickly select desired information than the above-described scheme in which the initial letter of a specific word is simply specified. With this technology, the user specifies a specific percentage portion displayed on a percentage display bar, and a predetermined number of pieces of information that are centered about the specified portion are presented to the user. Thus, when a desired piece of information does not exist in the presented information, the user must repeat the same operation many times through trial and error when searching for the desired piece of information. Accordingly, it is desired to develop a scheme for more quickly, easily, and accurately searching for desired information.

Such an information search scheme may be performed not only for selecting a music track, an artist, or the like in an audio apparatus, as described above, but also for, for example, a navigation apparatus in which a destination is selected by selecting information from large number of location names, facility names, company names, personal names, and so on. In the case of navigation apparatuses, problems similar to those described above in connection with searching for audio tracks also arise. In addition, when searching for a desired telephone number or the like from a large number of pieces of information, it is apparent that similar problems arise.

SUMMARY OF THE INVENTION

Accordingly, one object of the present invention is to provide an information search apparatus and an information search method which are capable of quickly, easily, and accurately searching for a desired piece of information from a large number of pieces of information, and which are capable of presenting the search results in a user friendly manner, even when the number of pieces of information is significantly large.

In order to overcome the above-described problems, one aspect of the present invention provides an information search method. The search method may include: arranging, in a predetermined order, names associated with pieces of information to be searched; displaying a range display bar on a display screen, the range display bar being divided into sections according to arbitrary values; displaying, adjacent to the range display bar, a detailed-name-of-information display section that displays detailed information associated with the names in a scrollable manner; designating a range for searching the pieces of information based on an input selecting an arbitrary search range displayed on the range display bar; searching the arranged names within the designated search range for names corresponding to the divided sections of the range display bar; displaying a portion of at least one name on at least one of the divided sections of the range display bar, where the portion of the at least one name includes an initial letter of the at least one name corresponding to the divided sections of the range display bar; and displaying detailed information associated with the names within the designated search range on the detailed-name-of-information display section in the arranged predetermined order.

In another aspect, when the portion of the name displayed on a first divided section of the range display bar is the same as the portion of the name displayed on a second divided section disposed adjacent to the first divided section, the number of letters including the initial letter displayed in the first and second divided sections is increased so as to allow for differentiation therebetween.

In yet another aspect, the designated search range has a start point and an end point that are selected using the range display bar on the display screen. In some cases, the designated search range may be determined based on a touch and slide input extending from a first point to a second point on the range display bar.

In other aspects, percentages associated with the number of the pieces of information and the divided sections are displayed on the range display bar in conjunction with the portions of the names.

In some cases, the information search method may also include: arbitrarily dividing the names associated with the pieces of information into information-name groups; and displaying tabs corresponding to the information-name groups on the detailed-name-of-information display section, wherein when a tab is selected the detailed-name-of-information display section sequentially displays the detailed information associated with the names in the group belonging to the designated tab; and wherein when the names corresponding to the divided sections are searched with respect to the names in the information-name group corresponding to the selected tab, the range display bar displays at least a portion of the names found in the search in the divided sections. The names may be divided into information-name groups based on a range designation input, and each time the range designation input is changed, the display of the tabs may also be changed.

In another aspect, the present invention provides an information search apparatus. The apparatus may include: an information-name-order arrangement processing unit configured to arrange in a predetermined order, names associated with pieces of information to be searched; a range-display-bar forming unit configured to form a range display bar on a display screen, the range display bar being divided into sections according to arbitrary values, wherein at least portions of the names are displayed on the range display bar; a detailed-name-of-information display processing unit configured to form, adjacent to the range display bar, a detailed-name-of-information display section that displays detailed information associated with the names in a scrollable manner; a range-display-bar narrowing unit configured to receive a range designation input based on the arbitrary ranges displayed on the range display bar, wherein the range designation input designates a range of the names to be searched; a range-display-bar display-information searching unit configured to search the arranged names for names corresponding to the divided sections of the range display bar, with respect to the designated range; a range-display-bar information-name display processing unit configured to display the at least portions of the names on the divided sections of the range display bar, wherein the at least portions of the names comprise at least initial letters of the names obtained in the search; and a detailed-name-of-information display processing unit configured to display the detailed information associated with the names in the designated range on the detailed-name-of-information display section in the predetermined arrangement order.

In one embodiment, when the portion of the name displayed in a first section on the range display bar is the same as the portion of the name displayed in a second section disposed adjacent to the first section, the range-display-bar information-name display processing unit may increase the number of letters displayed in each section so as to allow for differentiation therebetween.

In other embodiments, the range-display-bar narrowing unit may designate the search range based on range designation inputs indicating a start point and end point based on the range display bar.

In one aspect, the range-display-bar narrowing unit may designate the search range based on a touch and slide range designation input based on the range display bar.

In another aspect, the range-display-bar forming unit may display percentages associated with the number pieces of information and the divided sections in conjunction with the parts of the information names.

In yet another aspect, the names may be arbitrarily divided into information-name groups, and the detailed-name-of-information display processing unit may form tabs corresponding to respective information-name groups and sequentially displays the detailed information associated with the names in the group belonging to the designated tab when a tab is selected. In this case, the range-display-bar name display processing unit may search for the names corresponding to the divided sections based on the names in the information-name group associated with the selected tab, and display the at least a portion of the names obtained from the search on the information display bar.

In one embodiment, the detailed-name-of-information display processing unit may form the tabs for respective arbitrarily-divided information-name groups based on the names in the designated range, and each time the designated range is changed, the detailed-name-of-information display processing unit changes display of the tabs. The display screen may also display a total number of pieces of information to be currently searched. In another aspect, a detailed-range display bar that displays detailed ranges may be formed adjacent to the range display bar, the number of detailed ranges being larger than the number of the divided sections of the range display bar. Preferably, the search range is designated based on the range display bar or the detailed-range display bar. In another embodiment, the pieces of information to be searched may comprise music information in an audio apparatus. In other embodiments, the pieces of information to be searched may comprise destination information in a navigation apparatus.

With the configuration described above, according to the present invention it is possible to quickly, easily, and accurately search for a desired piece of information from a large number of pieces of information and it is possible to present the information obtained from the search, even when the number of pieces of information is significantly large.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS

Figure 1:
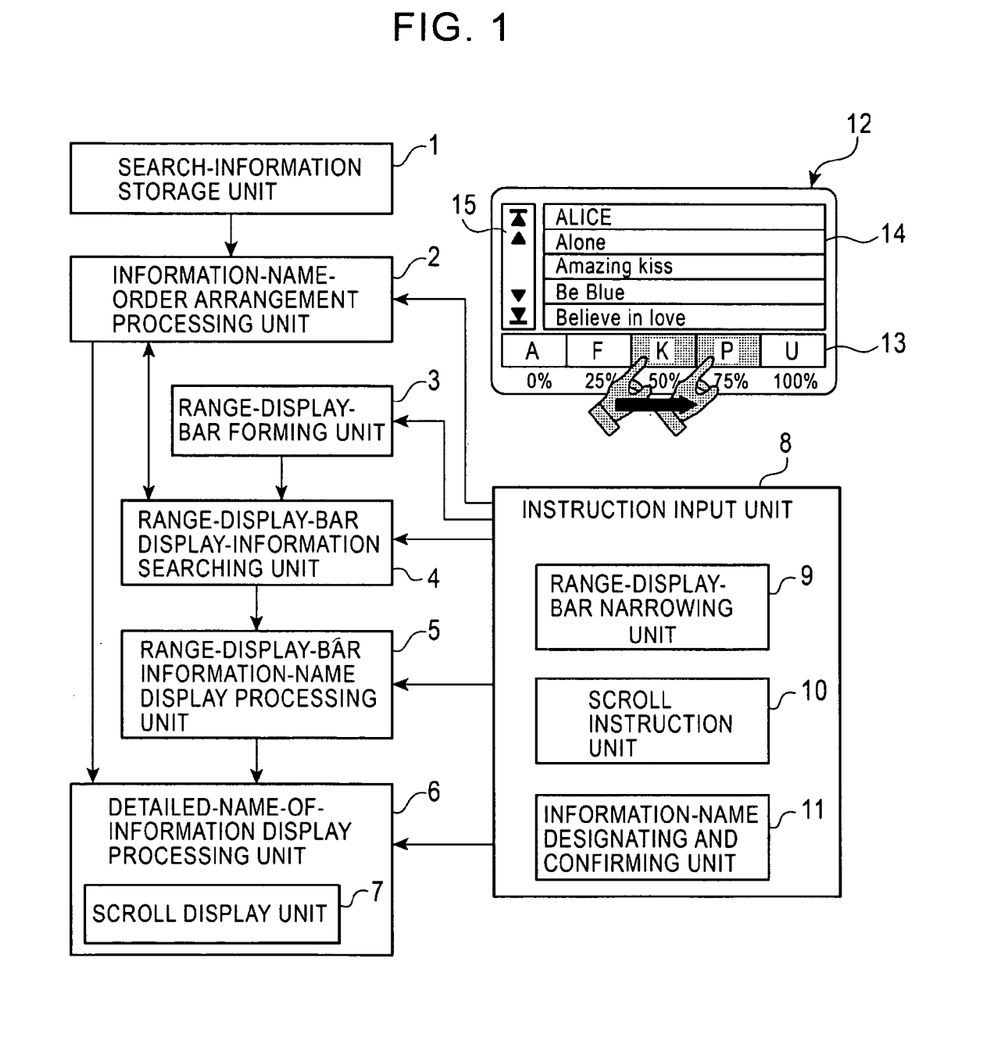
FIG. 1 is a functional block diagram according to an embodiment of the present invention.

An embodiment of the present invention is described below with reference to the accompanying drawings. FIG. 1 is a functional block diagram of an apparatus for implementing an information search method according to an embodiment of the present invention. In the example shown in FIG. 1, an information search apparatus includes a search-information storage unit 1 in which information to be searched by an information search apparatus is stored. An information-name-order arrangement processing unit 2 performs processing for arranging information names, which are given to information stored in the search-information storage unit 1. The information names are preferably arranged in a preset order or a predetermined order (e.g., an English alphabetical order or a Japanese alphabetical order) set by a user through an instruction input unit 8. The instruction input unit 8 includes a rate-display-bar narrowing unit 9, a scroll instruction unit 10, and an information-name designating and confirming unit 11, which are described below.

A rate-display-bar forming unit 3 displays a rate display bar 13, which may be shown at a lower portion on a display screen 12. In the illustrated example, the rate display bar 13 has a horizontally extending rectangular shape and is divided into five sections, which serve as letter display sections, respectively. Other shapes and number of divisions are contemplated. Percentages corresponding to the positions of the left edges of the respective divided sections are shown therebelow. Thus, in the illustrated example, 0%, 25%, 50%, 75%, and 100% are displayed sequentially from the left side. Such a display form can be set arbitrarily, and may be configured to be arbitrarily changeable by a user setting/input, for example, during initial setting through the instruction input unit 8.

When the predetermined rate display bar 13 is formed by the rate-display-bar forming unit 3, as described above, the rate-display-bar display-information searching unit 4 performs processing to search for the names of pieces of information contained in a range designated by a search narrowing instruction, received from the range-display-bar narrowing unit 9 of the instruction input unit 8, from the information names arranged by the information-name-order arrangement processing unit 2. In an initial state of the rate display bar 13, all the pieces of information are selected. However, when the user issues the search narrowing instruction, the searching is performed within the narrowed range, as described below. Also, regardless of whether a search narrowing operation is performed or not, information corresponding to the divided rate sections on the rate display bar is preferably searched as described above.

A rate-display-bar information-name display processing unit 5 performs processing to display at least parts of the names of the pieces of information that correspond to the rates (%) displayed below the rate display bar 13 that is formed as described above (e.g., in the illustrated example, five divided letter-display sections). Because the display size is limited, each letter display section preferably is not allocated a large space, thus, for example, only an initial letter may be displayed in order to allow for recognition of the letters at a glance. Alternatively, when the letters displayed in adjacent letter display sections are the same, a second or third letter or the like may be displayed adjacent to the initial letter, as required, in order to allow for differentiation between the identical initial letters displayed in the adjacent letter display sections. During a search narrowing operation, the letters displayed on the rate display bar of the initial screen displayed at the start of the search operation are changed in accordance with the search narrowing operation so that the names of the pieces of information corresponding to the narrowed range are displayed.

A detailed-name-of-information display processing unit 6 performs processing to display detailed names of pieces of information on a detailed-name-of-information display section 14 formed above the rate display bar 13 on the display screen 12. Initially, the detailed names of the pieces of information are displayed sequentially from a first piece of information in the narrowed range on the rate display bar 13. In the illustrated example, five pieces of information are displayed in a predetermined order. The names of pieces of information are sequentially read from the information names that have been arranged by the information-name-order arrangement processing unit 2. The names of the pieces of information are then displayed on the display screen 12.

The detailed-name-of-information display processing unit 6 may include a scroll display unit 7. When the user issues an instruction via the scroll instruction unit 10 of the instruction input unit 8, the scroll display unit 7 allows the information names sequentially displayed as described above to be scrolled. In order to allow such a scrolling operation, a scroll bar 15 may be provided at a left edge of the display screen 12, as shown in the illustrated example, to allow the displayed information names to be changed by scrolling using a remote controller or a touch panel.

The instruction input unit 8 allows the user to input an instruction. In this case, the display screen 12 may have a touch panel on a surface thereof, as illustrated. When the user touches a predetermined portion on the rate display bar 13 with a finger or the like, and then slides the finger to another portion on the rate display bar 13 while the finger is kept in contact therewith, the rate-display-bar narrowing unit 9 issues an instruction for narrowing the search range on the rate display bar 13 corresponding to the user input. When the user touches a portion on the rate display bar 13 and slides the finger in such a manner, it is preferable that the touched portion be displayed, for example, in a different color for easy differentiation from the unselected portions in order to clearly display which portion is being touched/selected by the user. In addition to such touching and sliding operations, a range between a portion corresponding to a location pressed in a first pressing operation and a portion corresponding to a location pressed in a second pressing operation may be used as the designated range. In such a case, a remote controller or the like may be used to move a cursor to designate the two opposite ends of the range.

When the touched portion is detected, the range corresponding to the letter display section displayed on the range display bar 13 may be designated and input. In addition, a more specific range corresponding to a range between a touched portion and a released portion on the range display bar 13 may be detected so that the search narrowing operation is performed according to the specified range.

The scroll instruction unit 10 in the instruction input unit 8 scrolls the detailed names of the information that are sequentially displayed on the detailed-name-of-information display section 14. The scrolling operation may be performed using various methods, such as touching of a portion on the scroll bar 15 or using a remote controller or the like. When the detailed names of the pieces of information are displayed as described above, the information-name designating and confirming unit 11 displays the designated information names, for example, in a different color than the other non-designated information names so as allow for easy differentiation, and causes the designated information names to be changed in order through the scrolling operation. When a desired information name is displayed, the information-name designating and confirming unit 11 allows the user to designate the portion of the desired information name and to confirm it by pressing a confirm button or the like.

Figure 2:
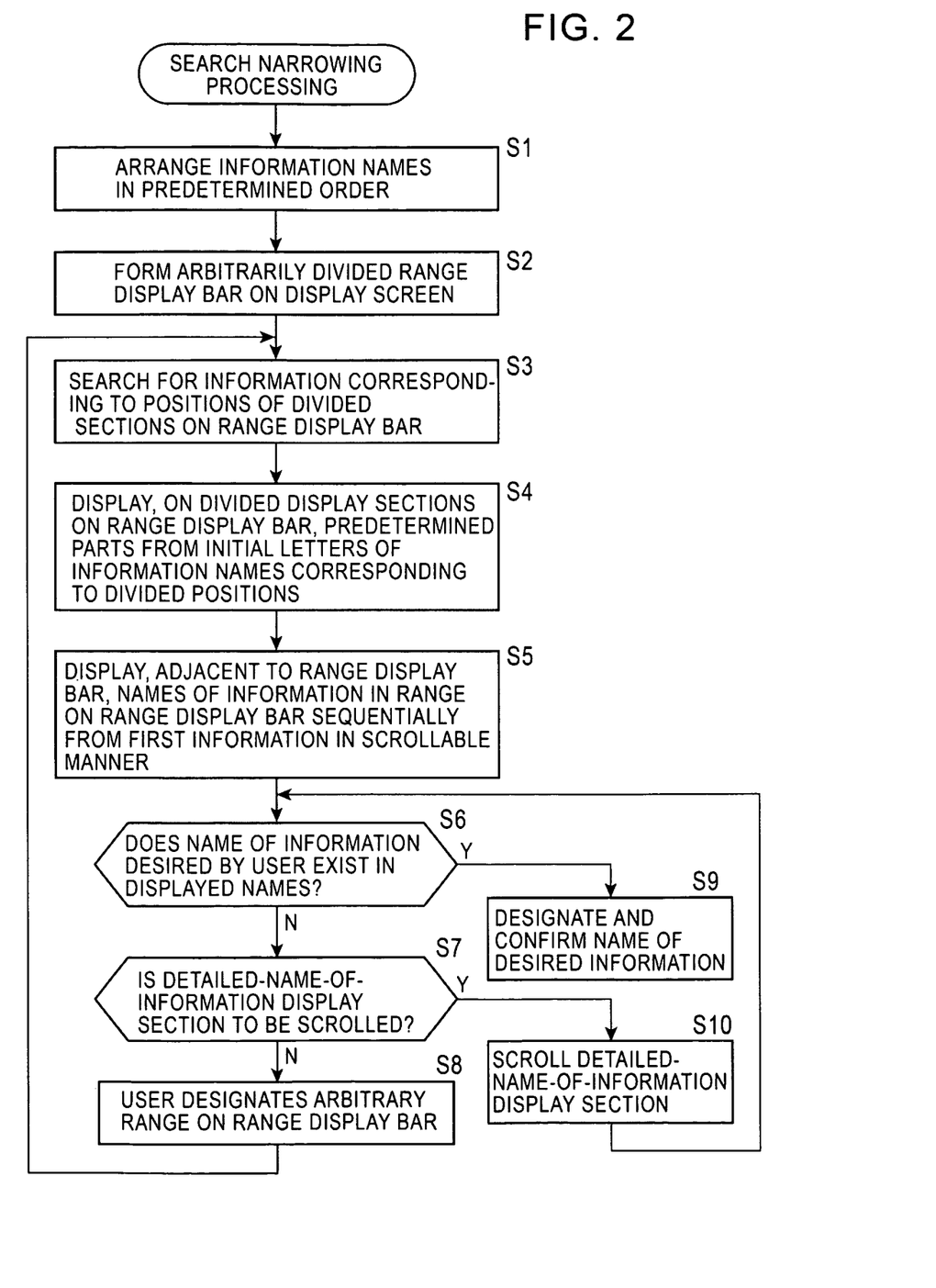
FIG. 2 is an operation flow of the embodiment.

The above-described functional blocks according to the present embodiment of the present invention can operate in accordance with, for example, an operational flow/process as shown in FIG. 2. The operational flow/process shown in FIG. 2 will now be described with reference to the functional block diagram shown in FIG. 1 and the display examples shown in FIGS. 3A to 5D. As shown in the narrowing search process of FIG. 2, with respect to information that is searched first, processing is performed to arrange the names of the information in a predetermined order, for example, an alphabetical order (step S1). This processing may be performed by the information-name-order arrangement processing unit 2 of FIG. 1, which arranges the names of predetermined information stored in the search-information storage unit 1 in a predetermined order, such as an alphabetical order.

Figure 3A:
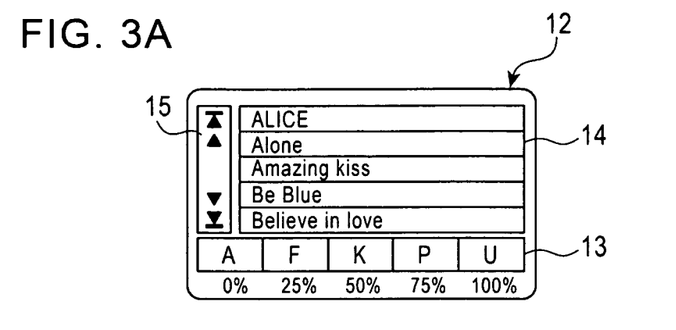
FIGS. 3A to 3D show examples displayed on a screen in the present embodiment.

Subsequently, an arbitrarily divided range display bar is formed on a display screen (step S2). For example, as shown in FIG. 3A, a display screen 12 that is similar to the display screen 12 of FIG. 1 and a horizontally extending rectangular range display bar 13 may be displayed at a lower portion of the display screen 12. The illustrated range display bar 13 is divided into five sections, which serve as letter display sections, respectively. The numeric values (%) of ranges corresponding to the left edges of the respective letter display sections are displayed therebelow.

Figure 6A:
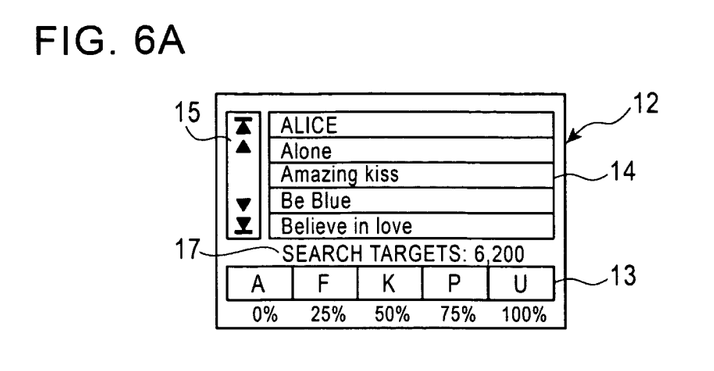
FIGS. 6A to 6D show examples displayed on the screen in yet another embodiment.
Figure 6B:
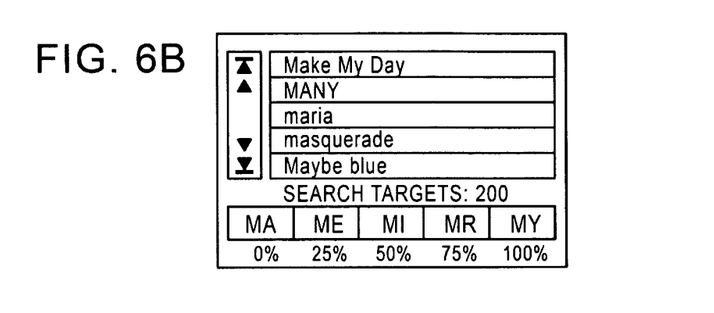

In the illustrated example, 0% of the total percentage is displayed below the letter display section disposed at the left end of the range display bar 13, which corresponds to a first piece of information in the range of pieces of information that are associated with the range display bar 13. Adjacent to the 0% portion, 25%, 50%, 75%, and 100% are displayed. At the 100% information portion, a last piece of information in the range of pieces of information that are associated with the range display bar 13 is displayed. In addition to the display of the percentages, for example, a number-of-search-targets display section 17 may be provided to display the number of targets to be currently searched, for example, in a display form showing "the number of search targets: 6,200," as shown in FIG. 6A. During the narrowing of the search targets, for example, "the number of search targets: 200" may be displayed on the screen, as in FIG. 6B. In this way the user can know to what degree the targets have been narrowed down. Displaying such information on the screen may also be used to determine whether or not to scroll the information displayed on the detailed-name-of-information display section 14.

Thereafter, pieces of information corresponding to the positions of the letter display sections on the range display bar are searched for in the information arranged in the predetermined order (step S3). More specifically, with respect to the names of the pieces of information that are processed by the information-name-order arrangement processing unit 2 and with respect to a range designated by the range-display-bar narrowing unit 9, the range-display-bar display-information searching unit 4 of FIG. 1 searches for, and reads from the range-display-bar forming unit 3, information corresponding to the divided sections to be displayed on the range display bar 13.

Predetermined portions of the information names corresponding to the divided sections, e.g. the initial letters of the information names, are displayed on the corresponding divided display sections on the range display bar 13 (step S4). In the example shown in FIG. 3A, the left-edge portion of the divided letter display sections corresponds to the position of 0%, and also corresponds to the name of the first piece of information in the specified range. In the illustrated example, the position of 0% indicates that the initial letter of the name of the information is alphabetical letter "A". Any number of additional letters adjacent to the predetermined initial letter may be displayed in each letter display section. In general, usability is improved when the letter sizes (and their corresponding divided sections) are large enough to allow the user to easily view the displayed letters, thus the letters and divided sections are preferably displayed as large as possible. The illustrated example, therefore, shows a case in which the display bar is divided into five sections and only one letter, e.g. an initial letter, is displayed in each letter display section.

As a result, the initial letter of the name of the information corresponding to 25% in the range of information to be searched is alphabetical letter "F," the initial letter of the name of information corresponding to 50% is alphabetical letter "K," the initial letter of the name of information corresponding to 75% is alphabetical letter "P," and the initial letter of the name of the last information corresponding to 100% is alphabetical letter "U" on the range display bar 13 shown in FIG. 3A. The display processing is performed by the range-display-bar information-name display processing unit 5 of FIG. 5, based on the results of the search performed by the range-display-bar display-information searching unit 4.

Thereafter, the names of the pieces of information corresponding to the range displayed on the range display bar 13 are displayed adjacent to the range display bar 13 (in this example, the information is displayed above the range display bar 13) sequentially from the first piece of information in a scrollable manner (step S5). In the example shown in FIG. 3A, a detailed-name-of-information display section 14 is provided immediately above the range display bar 13. The detailed-name-of-information display section 14 is divided into fields such that, with respect to potentially all pieces of information, each field has a length that allows display of almost the entire name of each piece of information and has a width that allows the user to easily read the name. In the example shown in FIG. 3A, the detailed-name-of-information display section 14 is divided into fields shown as rows. The detailed-name-of-information display section 14 displays the names of the pieces of information for the range associated with the range display bar 13 sequentially from the first piece of information.

With this arrangement, in the initial display state, the name of the first piece of information of all the pieces of information to be searched is first displayed, for example, as shown in FIG. 3A the name "ALICE" is displayed. Portions of the names of information that cannot be displayed on the detailed-name-of-information display section 14 may be displayed through appropriate scrolling by the user. In the example shown in FIG. 3A, a vertically extending scroll bar 15 is provided at the left side of the detailed-name-of-information display section 14. Upon touching of the scroll bar 15, the screen can be arbitrarily scrolled.

Subsequently, a determination is made as to whether or not the name of the piece of information desired by the user exists in the displayed names (step S6). When the user sees the displayed names, as in the detailed information display, and finds the desired information, the process proceeds to step S9. In step S9, the user performs an operation for designating and confirming the name of the desired information. This operation can be executed by the user pressing a confirm key when a field showing the detailed name of the desired information is specified by a cursor or the like, and is performed using an information-name designating and confirming unit 11 in the instruction input unit 8 shown in FIG. 1.

When it is determined in step S6 that the name of the information desired by the user does not exist in the displayed names, a determination is made as to whether or not the detailed-name-of-information display section 14 is to be scrolled (step S7). When the user determines that the name of the desired information will be displayed through scrolling, it is determined that the detailed-name-of-information display section 14 is to be scrolled and the process proceeds to step S10. In step S10, the detailed-name-of-information display section 14 is scrolled.

In step S7, when it is determined that the detailed-name-of-information display section 14 is not to be scrolled, that is, when the user views the display screen 12 and decides, for example, that it will take a large amount of time to find the desired information through scrolling, the user may designate an arbitrary range on the range display bar 13 to narrow the range (step S8). In this case, the display screen 12 may include a touch panel. In the example shown in FIG. 3B, by referring to letters such as the initial letters displayed on the letter display sections of the range display bar 13, the user predicts where the desired information exists. In accordance with the degree of uncertainty about the location of the desired information, the user may set the range wider and designate the range by sliding a finger or the like on the range display bar 13. At this point, when the user knows an approximate location, the user may designate a desired range by only touching a specific range portion.

Figure 3B:
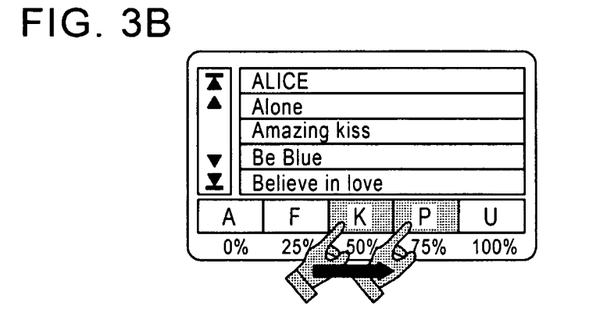

FIG. 3B shows an example in which, in the display state shown in FIG. 3A, a range from alphabetical letter "K" at the portion of 50% on the range display bar 13 to alphabetical letter "P" at the portion of 75% is selected by sliding a finger. Thus, in the state in which the entire range of information to be initially searched is selected, the user can issue an instruction for narrowing the search range to a 50-75% portion of the entire amount of information. In this case, the user can check the names of pieces of information that exist in the percentage portion by not only referring to the numeric values displayed on the range display bar 13 but also by referring to letters displayed on the letter display sections on the range display bar 13. Thus, this arrangement provides an easy-to-understand search range narrowing operation.

Figure 3C:
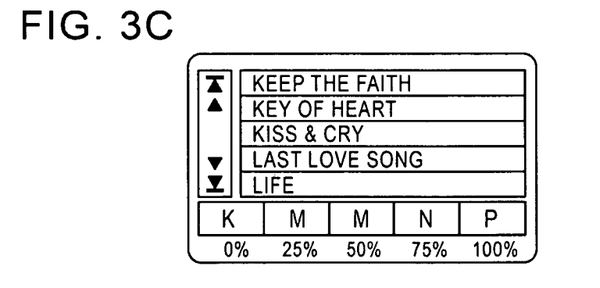

When the user designates an arbitrary range on the range display bar 13 to perform a narrowing search operation in step S8, as described above, the process returns to step S3 and the subsequent processing steps are repeated to perform similar searches based on narrowed search ranges, and so on. After the range is designated and narrowed down as described above in FIG. 3B, information as shown in FIG. 3C is displayed. In the example shown in FIG. 3C, the range is narrowed down to information including the initial letter "K" of information, which corresponds to 50% of all the information, to the initial letter "P" of information, which corresponds to 75% of all the information, since the range designated in FIG. 3B is 50 to 75%. As a result, in this example, the initial letter "K" is displayed on the letter display section for 0% on the range display bar 13 and the initial letter "P" is displayed on the letter display section for 100%. In addition, between letters "K" and "P", initial letters "M", "M", and "N" are displayed on the letter display sections for 25%, 50%, and 75%, respectively.

In this case, the detailed-name-of-information display section 14 sequentially displays the pieces of information in the narrowed range from the first piece of information therein. For example, as illustrated in FIG. 3C, the pieces of information are sequentially displayed from "KEEP THE FAITH." The displayed information may also be scrolled on the displayed screen. Thus, when the user sees the displayed information and determines that it is easy to find the desired information through scrolling, scroll display processing is performed. When the user views the displayed information and determines that it is necessary to further narrow the search range, he or she performs another search narrowing operation, which is similar to the one described above, as shown in FIG. 3D.

Figure 3D:
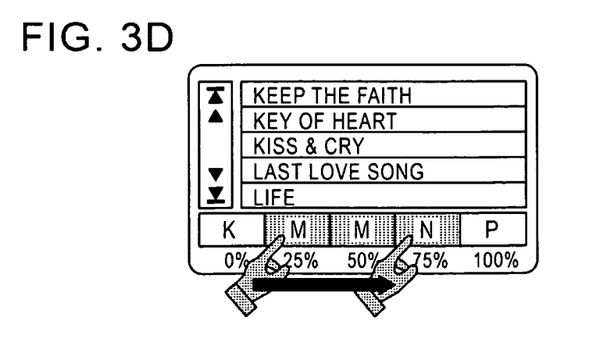

FIG. 3D shows an example in which the first letter "M" corresponding to 25% on the range display bar 13 is touched with a finger and the finger is slid and then released at the portion "N" corresponding to 75%. As shown in FIG. 3D, it is assumed that the name of the information desired by the user is "Money." If the user determines that it is necessary to perform a search up to the portion "N" corresponding to 75% based on the assumption that the number of pieces of information having an initial letter "M" is large, and that the name of the desired information may exist in one of the portions "M" corresponding to the first 25% or the next 50%, or the portion corresponding to more than 50%, a range designation operation as described above is performed. Thereafter, a similar narrowed search is performed as shown in FIG. 2. Lastly, in step S9, the name of the desired information is designated and confirmed.

Figure 4A:
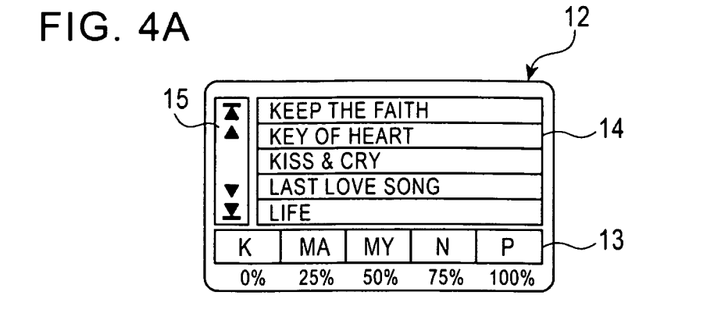
FIGS. 4A to 4D show other examples displayed on the screen in the present embodiment.
Figure 4B:
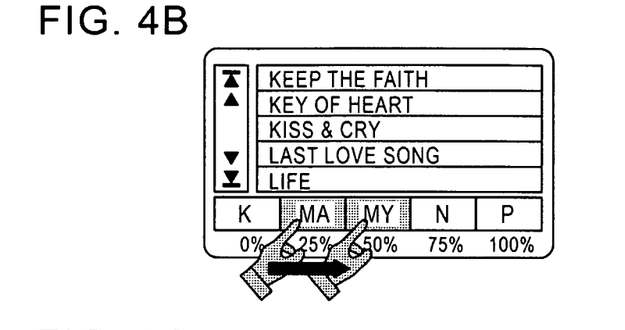

In the example shown in FIG. 3C, since a large number of pieces of information whose initial letters are "M" exist in the narrowed search range, the letter "M" is displayed in two of the divided sections of the range display bar 13 and the differentiation therebetween is not clear. In order to make the distinction between the two letters "M", for example, two or more letters may be displayed next to the initial letter as shown in FIG. 4A. Consequently, "MA" is displayed at the 25% portion and "MY" is displayed at the 50% portion.

Figure 4C:
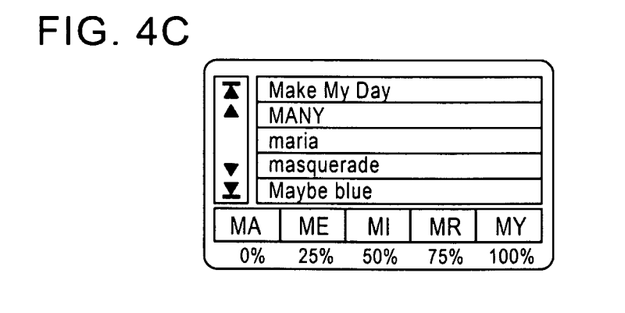

Such display allows the user to know that the desired piece of information "Money" exists between "MA," which corresponds to 25%, and "MY," which corresponds to 50%. Thus, the range can be narrowed to a smaller range than the range shown in FIG. 3D, thereby allowing the search to be performed in an efficient manner. As a result of narrowing the search, information as shown in FIG. 4C is displayed. In the illustrated example, "MA" is displayed at the 0% portion, "ME" is displayed at the 25% portion, "MI" is displayed at the 50% portion, "MR" is displayed at the 75% portion, and "MY" is displayed at the 100% portion.

During the display of the letters, since only the initial letters are displayed in the adjacent letter display sections of the range display bar 13 it results in the same letter "M" being displayed in both sections. Thus, two letters (the initial letter and a second letter) are displayed to allow for differentiation between the letters on the adjacent letter display sections. In this case, the name of the first piece of information in the narrowed search range displayed on the detailed-name-of-information display section is "Make My Day", which is followed by the names of the pieces of information as shown in FIG. 4C.

Figure 4D:
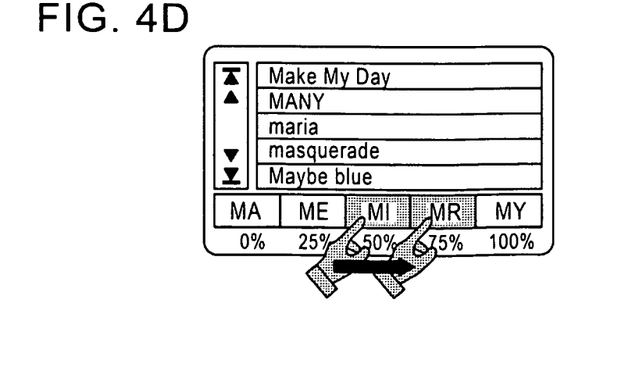

The information displayed in FIG. 4C may be scrolled in this state until "Money" is displayed, but if the user determines that it will take a large amount of time to scroll to "Money" considering the total number of pieces of information and so on, it is possible to perform search narrowing operations as shown in FIG. 4D. FIG. 4D shows an example in which, "MI" at the 50% portion and "MR" at the 75% portion are selected to narrow the range since "Money" exists therebetween.

Figure 6C:
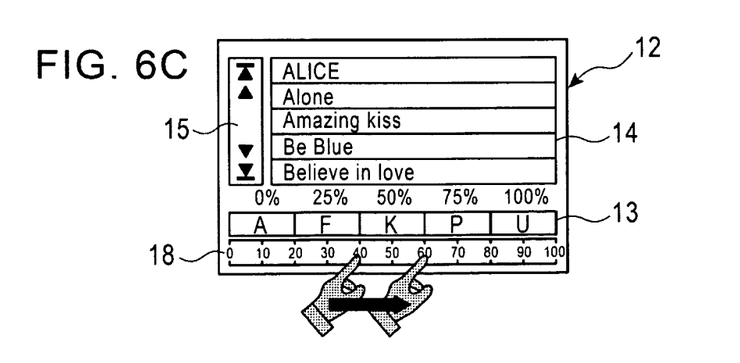

During narrowing search operations based on the percentage display, for example, as shown in FIG. 6C, a range scale bar 18 that indicates only ranges may be provided in addition to the range display bar 13, which displays parts of the information names. In this example, the search range can be narrowed down by not only general searching as described above using the range display bar 13, but also by selecting (through sliding a finger or the like), for example, a range of 40 to 60% or a range of 50 to 60% on the range scale bar 18. In this arrangement, the user can specifically designate an approximate location while seeing parts of the information names displayed on the range display bar 13. Thus, in the narrowed range shown in FIG. 3B, when the user thinks that narrowing the range for the search to about half of all the pieces of information is not sufficient, the user can perform a finer search narrowing operation using the above-described method. Although the example in FIG. 6C shows a case in which the range scale bar 18 is provided in addition to the range display bar 13 so as to allow the user to designate a range by, for example, touching the range scale bar 18, the arrangement may also be such that a position touched on the range display bar 13 is read as a position on the range scale bar 18 to perform a narrowing search operation similar to that described above.

The present invention can be carried out in various other forms. For example, the present invention can be carried out as in the display examples shown in FIGS. 5A to 5D. As in the examples shown in FIGS. 3A to 4D, in FIGS. 5A to 5D, a range display bar 13 is provided at a lower portion of a display screen 12, a detailed-name-of-information display section 14 is provided above the range display bar 13, and a scroll bar 15 is provided at the left side of the detailed-name-of-information display section 14. However, in the examples shown in FIGS. 5A to 5D, the detailed-name-of-information display section 14 is divided so as to correspond to tabs 16. The initial letters of the names of pieces of information can be displayed on the corresponding tabs 16. In this example, all the pieces of information are broadly divided into three groups and the initial letters "A", "M", and "T" of the first pieces of information of each of the respective groups are sequentially displayed.

Figure 5A:
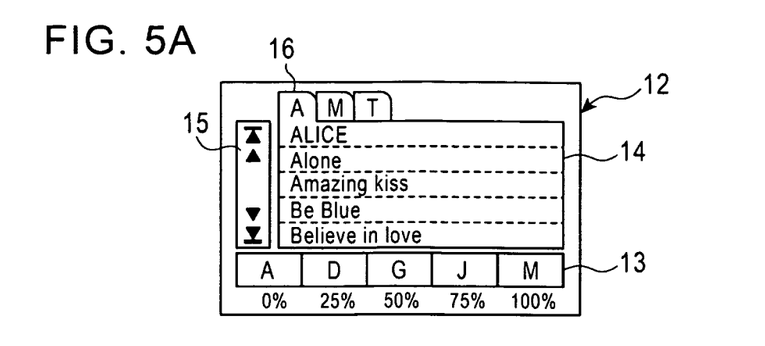
FIGS. 5A to 5D show examples displayed on the screen in another embodiment.

FIG. 5A shows an example of an initial screen, on which information belonging to the tab "A" is narrowed. Thus, in this example, all the information on the range display bar 13 is included in information from the first tab "A" up to the next tab "M". Thus, "A", "D", "G", "J", and "M" are displayed on the letter display sections for the respective ranges corresponding to tab "A". This display process for this embodiment is similar to the display process for the above-described example, and will therefore not be described.

Figure 5B:
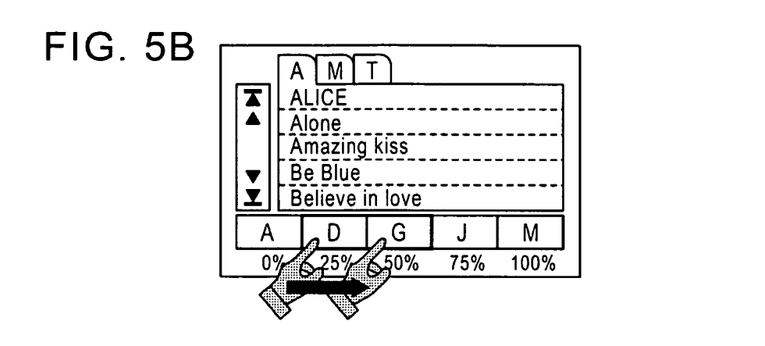

Information displayed on the detailed-name-of-information display section 14 in this example is information that is included in the range of information belonging to the tab "A". When a large number of pieces of information exist in the range, the information can be displayed by scrolling using the scroll bar 15 in the manner described above. In this display state, when the user assumes that desired information exists in the range of information belonging to the tab "A", a narrowing search operation that is similar to that described above is performed, as shown in FIG. 5B. In the illustrated example, since the user assumes that the desired information exists in the range of "D" corresponding to 25% and "G" corresponding to 50%, the search narrowing operation is performed as shown in FIG. 5B.

Figure 5C:
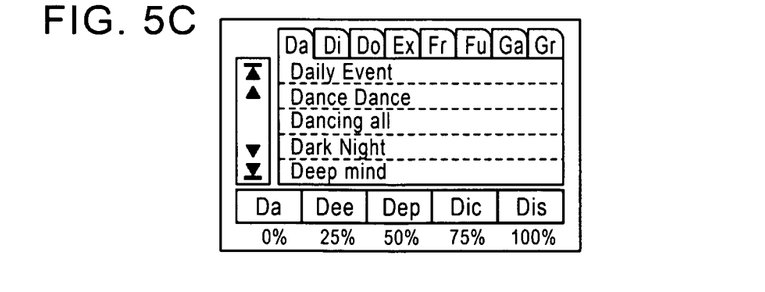
Figure 5D:
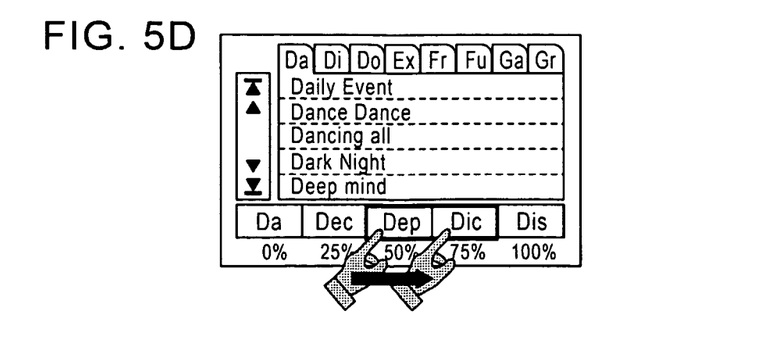

As a result of the search narrowing operation, information as shown in FIG. 5C is displayed. In the illustrated example, only information in the range of "D" to "G" is divided into a substantially equal number of groups according to tabs, which show "Da", "Di", "Do", "Ex", "Fr", "Fu", "Ga", and "Gr" that represent the first two letters of the first pieces of information in the divided groups. Two letters are also displayed in this case so that the names shown on the adjacent tabs are distinguishable from each other. The illustrated example shows a case in which the tab "Da" displayed at the top tab is selected and, in the manner described above, all the pieces of information belonging to the selected tab are divided and "Da", "Dee", "Dep", "Dic", and "Dis" are displayed on the letter display sections of the range display bar 13. In this case, if only two letters "De" or "Di" are displayed, the letters displayed in adjacent display sections are the same and become indistinguishable. Thus, to avoid such problems three letters, including the initial letter, are displayed.

When the user determines that it will take too much time to find the desired information, for example, the information name "Diamond", by scrolling in the state shown in FIG. 5C, the user can perform a search narrowing operation by selecting (through a touch and slide operation or the like) the range of "Dep" to "Dic". When information is divided according to the tabs as described above, the amount of information belonging to each tab is reduced. Thus, the amount of information corresponding to each letter display section on the range display bar, which displays a range relative to the amount of all the information, is reduced, thereby increasing the efficiency of the narrowing search operation.

Figure 6D:
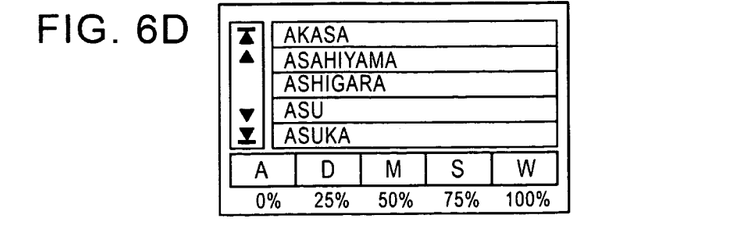

Although the description in the above embodiment of the present invention has been described in relation to an information search method and an information search apparatus that search for a desired music track or the like stored in an audio apparatus having a data storage medium in which a large number of information is stored, the present invention is not limited thereto. The present invention is also effectively applied to navigation systems in which a destination is selected through selection of information from a large number of location names, facility names, company names, personal names, and so on. In such a case, for example, when a large number of information corresponding to company names or the like exists as destinations stored in the data storage medium, the information may be displayed as shown in FIG. 6D and the narrowing search operation is performed using processes similar to those described above. The search process shown in FIG. 6D may also be used to search for a telephone number, and designation of a desired company name may also allow information associated with the company name, such as its telephone number and address, to be displayed. The present invention is also effectively applied to other fields that may be displayed on a navigation apparatus in which desired information is searched for from a large number of pieces of information.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information search method comprising:
    arranging, in a predetermined order, names associated with pieces of information to be searched;
    displaying a range display bar on a display screen, the range display bar being divided into sections according to arbitrary percentage values, wherein the arbitrary percentage values correspond to a number of pieces of information in a section relative to a total number of the pieces of information to be searched;
    displaying, adjacent to the range display bar, a detailed-name-of-information display section that displays detailed information associated with the names in a scrollable manner;
    receiving from a user a range designated for searching the pieces of information based on an input selecting a range displayed on the range display bar;
    searching the arranged names within the designated search range;
    displaying, in response to receiving the range designated for searching, a portion of at least one name associated with a piece of information obtained in the search on at least one of the divided sections of the range display bar, wherein the portion of the at least one name includes an initial letter of the at least one name; and
    displaying detailed information associated with the names within the designated search range on the detailed-name-of-information display section in the predetermined order;
    wherein multiple percentage values associated with the number of pieces of information and the divided sections are displayed on the range display bar in conjunction with the portion of the at least one name.

2. The information search method according to claim 1, wherein, when the portion of the name displayed on a first divided section of the range display bar is the same as the portion of the name displayed on a second divided section disposed adjacent to the first divided section, the number of letters including the initial letter displayed in the first and second divided sections is increased so as to allow for differentiation therebetween.

3. The information search method according to claim 1, wherein the designated search range has a start point and end point that are selected using the range display bar on the display screen.

4. The information search method according to claim 1, wherein the designated search range is determined based on a touch and slide input extending from a first point to a second point on the range display bar.

5. The information search method according to claim 1, further comprising:
    arbitrarily dividing the names associated with the pieces of information into information-name groups; and
    displaying tabs corresponding to the information-name groups on the detailed-name-of-information display section, wherein when a tab is selected the detailed-name-of-information display section sequentially displays the detailed information associated with the names in the group belonging to the selected tab,
    wherein when the names corresponding to the divided sections are searched with respect to the names in the information-name group corresponding to the selected tab the range display bar displays the at least a portion of the names found in the search in the divided sections.

6. The information search method according to claim 5, wherein the names are divided into information-name groups based on a range designation input, and each time the range designation input is changed, the display of the tabs is changed.

7. An information search apparatus comprising:
    a data storage medium for storing pieces of information to be searched;
    an information-name-order arrangement processing unit configured to arrange in a predetermined order, names associated with the pieces of information to be searched;
    a range-display-bar forming unit configured to form a range display bar on a display screen, the range display bar being divided into sections according to arbitrary percentage values, wherein the arbitrary percentage values correspond to a number of pieces of information in a section relative to a total number of pieces of information to be searched, and wherein at least portions of the names are displayed on the range display bar;
    a detailed-name-of-information display processing unit configured to form, adjacent to the range display bar, a detailed-name-of-information display section that displays detailed information associated with the names in a scrollable manner;
    a range-display-bar narrowing unit configured to receive from a user a range designation input based on a ranges displayed on the range display bar, wherein the range designation input designates a range of the names to be searched;
    a range-display-bar display-information searching unit configured to search the arranged names for names corresponding to the designated range;
    a range-display-bar information-name display processing unit configured to display, in response to receiving a range designation input, the at least portions of the names in the divided sections of the range display bar, wherein the at least portions of the names comprise at least an initial letter of the names obtained in the search; and
    a detailed-name-of-information display processing unit configured to display the detailed information associated with the names in the designated range on the detailed-name-of-information display section in the predetermined order;

wherein multiple percentage values associated with the number of pieces of information and the divided sections are displayed on the range display bar in conjunction with the at least portions of the names.

8. The information search apparatus according to claim 7, wherein, when the portion of the name displayed in a first section on the range display bar, is the same as the portion of the name displayed in a second section disposed adjacent to the first section, the range-display-bar information-name display processing unit increases the number of letters displayed in each section so as to allow for differentiation therebetween.

9. The information search apparatus according to claim 7, wherein the range-display-bar narrowing unit designates the search range based on range designation inputs indicating a start point and end point based on the range display bar.

10. The information search apparatus according to claim 7, wherein the range-display-bar narrowing unit designates the search range based on a touch and slide range designation input extending from a first point to a second point on the range display bar.

11. The information search apparatus according to claim 7, wherein the names are arbitrarily divided into information-name groups, and the detailed-name-of-information display processing unit forms tabs corresponding to respective information-name groups and sequentially displays the detailed information associated with the names in the information-name group belonging to each tab when a tab is selected, and
wherein the range-display-bar name display processing unit searches for the names corresponding to the divided sections based on the names in the group associated with the selected tab, and displays the at least a portion of the names obtained from the search on the information display bar.

12. The information search apparatus according to claim 11, wherein the detailed-name-of-information display processing unit forms the tabs for respective arbitrarily-divided information-name groups based on the names in the designated range, and each time the designated range is changed, the detailed-name-of-information display processing unit changes display of the tabs.

13. The information search apparatus according to claim 7, wherein the display screen displays a total number of pieces of information to be currently searched.

14. The information search apparatus according to claim 7, wherein a detailed-range display bar that displays detailed ranges is formed adjacent to the range display bar, the number of detailed ranges being larger than the number of the divided sections of the range display bar, and wherein the search range is designated based on the range display bar or the detailed-range display bar.

15. The information search apparatus according to claim 7, wherein the pieces of information to be searched comprises music information in an audio apparatus.

16. The information search apparatus according to claim 7, wherein the pieces of information to be searched comprises destination information in a navigation apparatus.

* * * * *